United States Patent
Ikegami et al.

(10) Patent No.: US 6,253,132 B1
(45) Date of Patent: Jun. 26, 2001

(54) AIR BAG APPARATUS

(75) Inventors: Kenji Ikegami; Junichi Ando; Hideo Takai, all of Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/224,996

(22) Filed: Jan. 4, 1999

(30) Foreign Application Priority Data

Jan. 6, 1998 (JP) ................................................. 10-001031

(51) Int. Cl.$^7$ .................................................. B60R 21/32
(52) U.S. Cl. ................................. 701/45; 701/29; 280/735
(58) Field of Search ......................... 701/29, 45, 46, 701/47; 280/734, 735; 307/10.1; 340/438

(56) References Cited

U.S. PATENT DOCUMENTS

| | | | |
|---|---|---|---|
| 4,059,822 | * 11/1977 | Toshioka et al. | 280/735 |
| 4,243,971 | * 1/1981 | Suchowerskyj et al. | 340/438 |
| 4,999,775 | * 3/1991 | Muraoka | 701/34 |
| 5,422,965 | * 6/1995 | Bekki et al. | 701/47 |
| 5,683,103 | 11/1997 | Blackburn et al. | 280/735 |
| 5,726,887 | * 3/1998 | Spies et al. | 701/29 |
| 5,964,815 | * 10/1999 | Wallace et al. | 701/45 |
| 5,992,880 | * 11/1999 | Cuddihy et al. | 280/735 |
| 6,045,156 | * 4/2000 | Spell et al. | 280/735 |
| 6,052,634 | * 4/2000 | Pathe et al. | 701/29 |
| 6,067,302 | * 5/2000 | Tozuka | 370/464 |
| 6,070,114 | * 5/2000 | Fendt et al. | 701/45 |
| 6,081,044 | * 6/2000 | Anthofer et al. | 307/10.1 |
| 6,088,639 | * 7/2000 | Fayyad et al. | 701/45 |

FOREIGN PATENT DOCUMENTS 197 09 197   10/1997   (DE) .

\* cited by examiner

*Primary Examiner*—Michael J. Zanelli
*Assistant Examiner*—E. Gibson
(74) *Attorney, Agent, or Firm*—Foley & Lardner

(57) ABSTRACT

An air bag apparatus to be disclosed has an air bag, an air bag driver for performing drive of the air bag to develop the air bag, and an air bag control device for controlling the drive of the air bag driver as a basic arrangement. The air bag control device has an arrangement in which an air bag operation selecting device having information related to selection of an operation state of the air bag driver can be connected to the air bag control device. Further, the air bag control device has a non-volatile storage device, determines a connection state of the air bag operation selecting device to the air bag control device, and stores information related to the determined connection state in the non-volatile storage device.

18 Claims, 3 Drawing Sheets

AIR BAG APPARATUS

BACKGROUND OF THE INVENTION

1. Field of the Invention

The present invention relates to an air bag apparatus and, more particularly, to an air bag apparatus being capable of selecting operations of air bag drivers respectively arranged for developing a plurality of air bags installed on a vehicle.

2. Description of the Related Art

Conventionally, there is proposed an air bag apparatus which detects information of the posture of a driver on a driver's seat, the presence/absence of an occupant on a passenger seat, and the posture of the occupant in a vehicle to control the operation of the air bag apparatus on the basis of the information.

Figure 1:
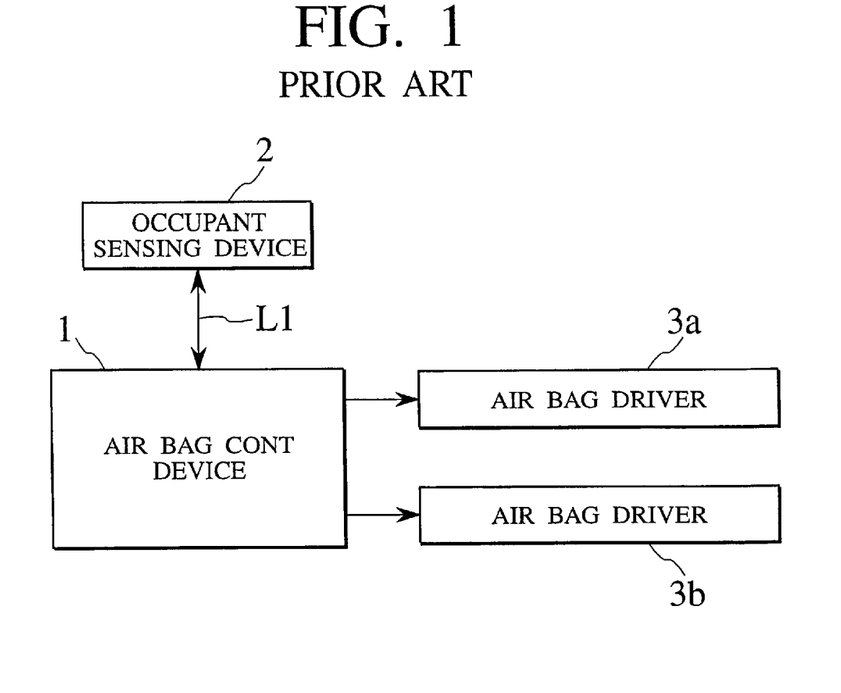
FIG. 1 is a block diagram showing a main arrangement of a conventional air bag apparatus.

More specifically, as in the main part shown in FIG. 1, an occupant sensing device 2 is connected to an air bag control device 1 through a communication line L1, and a driver's seat air bag driver 3a connected to a driver's seat air bag and a passenger seat air bag driver 3b connected to a passenger seat air bag are respectively connected to the air bag control device 1.

With this arrangement, information of the posture of the driver on the driver's seat, the presence/absence of the occupant on the passenger seat, and the posture of the occupant detected by the occupant sensing device 2 is transmitted to the air bag control device 1 through the communication line L1 to be received by the air bag control device 1.

The air bag control device 1 controls, on the basis of the received information, the driver's seat air bag driver 3a connected to the driver's seat air bag and the passenger seat air bag driver 3b connected to the passenger seat air bag.

Conventionally, there is also proposed an air bag apparatus which controls, on the basis of the will of a user of a vehicle, the operation of an air bag apparatus, e.g., the operation of the air bag apparatus such that the driver's seat air bag is developed or not and the passenger seat air bag is developed or not.

Figure 2:
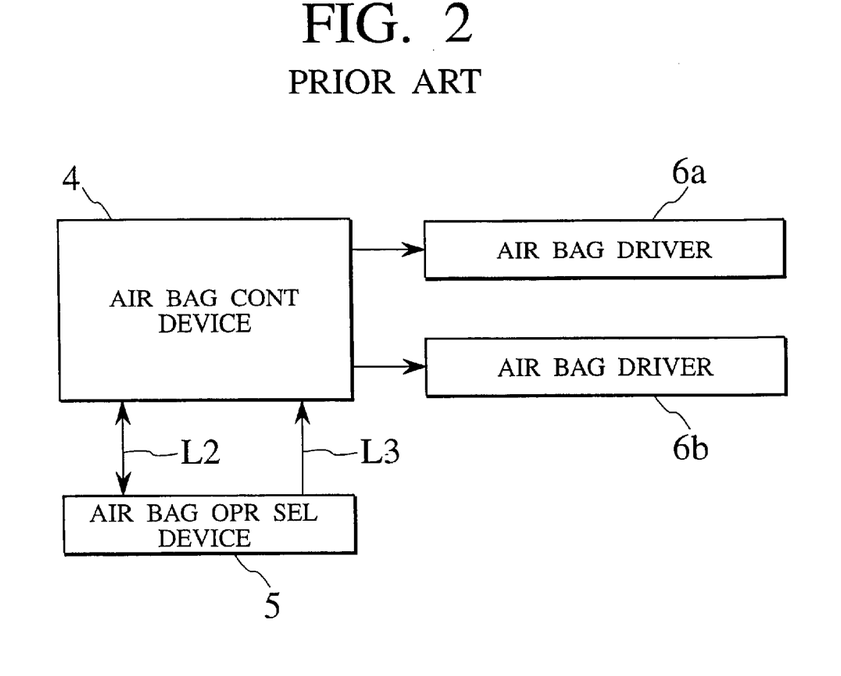
FIG. 2 is a block diagram showing another main arrangement of a conventional air bag apparatus.

More specifically, as in the main portion shown in FIG. 2, an air bag operation selecting device 5 is connected to an air bag control device 4 through communication lines L2 and L3, and a driver's seat air bag driver 6a connected to a driver's seat air bag and a passenger seat air bag driver 6b connected to a passenger seat air bag are connected to the air bag control device 4.

With this arrangement, when the ignition switch of the vehicle is turned on, the air bag control device 4 communicates with the air bag operation selecting device 5 through the communication line L2 to determine whether the air bag operation An selecting device 5 is connected to the air bag control device 4 or not.

Next, information which indicates that the air bag operation selecting device 5 is connected to the air bag control device 4 is transmitted to the air bag control device 4 through the communication line L2.

Then, the air bag control device 4 which receives the information further receives drive selecting information, which is transmitted from the air bag operation selecting device 5 through the communication line L3, indicating whether the driver's seat air bag driver 6a is driven or not and the passenger seat air bag driver 6b is driven, etc.

As the result, the air bag control device 4 controls, on the basis of the drive selecting information received as described above, the driver's seat air bag driver 6a connected to the driver's seat air bag and the passenger seat air bag driver 6b connected to the passenger seat air bag.

Here, the air bag operation selecting device 5 is generally attached to the air bag apparatus of a vehicle in a dealer or the like after the vehicle is out from a mass production line in a vehicle assembly firm. That is, the air bag operation selecting device 5 is attached as a so-called additional device in its after market.

As described above, in the air bag apparatus for the vehicle, information is exchanged between the air bag apparatus and its peripheral device by using various communication lines.

However, as the number of communication lines increases, the number of harnesses themselves constituting the communication lines and the number of connection terminals or the like of connectors increase to cause an increase in weight and cost or to make the layout in the vehicle complex.

Therefore, the air bag apparatus installed on the vehicle in which information is highly frequently exchanged between the air bag apparatus and the peripheral device has been urged to simplify the communication system, especially, reduce communication lines in number at present.

Above all, since the additional peripheral device such as the air bag operation selecting device emerges, a need to simplify the communication system is remarkably increasing.

SUMMARY OF THE INVENTION

It is an object of the present invention to provide an air bag apparatus, which is installed on a vehicle, in which information is exchanged between the air bag apparatus and its peripheral device, and in which its communication system is simplified, particularly, the number of communication lines is reduced.

More specifically, it is an object of the present invention to provide an air bag apparatus which can cope with a need to simplify its communication system for an additional peripheral device such as an air bag operation selecting device.

In order to achieve the above object, according to the present invention, there is provided an air bag apparatus which basically comprises an air bag, an air bag driver for performing drive of the air bag to develop the air bag, and an air bag control device for controlling the drive of the air bag driver. The air bag control device has an arrangement in which an air bag operation selecting device having information related to selection of an operation state of the air bag driver can be connected to the air bag control device. Here, the air bag control device has a non-volatile storage device, determines a connection state of the air bag operation selecting device to the air bag control device, and stores information related to the determined connection state in the non-volatile storage device.

With this arrangement, a single-purpose line used for determining whether the air bag operation selecting device is connected or not can be excluded, and the communication system can be easily simplified.

Here, more specifically, the air bag control device controls a drive operation of the air bag driver according to the information related to the connection state stored in the non-volatile storage device and on the basis of the information related to selection of an operate ion state of the air bag driver.

An air bag apparatus according to the present invention may further comprise an occupant sensing device for sensing information related to seating of an occupant. In this case, furthermore, the air bag control device can preferably control drive of the air bag driver on the basis of the information sensed by the occupant sensing device. In addition, the occupant sensing device may be a device which can sense information related to the presence/absence of equipment set on a seat, e.g., so-called a child seat, or a setting direction of the equipment.

The air bag apparatus according to the present invention further comprises a first communication line for connecting the occupant sensing device and the air bag control device to each other and a second communication line for connecting the air bag operation selecting device and the air bag control device to each other. Here, the second communication line is satisfactorily connected to the first communication line in parallel. More specifically, a signal corresponding to information related to seating of an occupant and sensed by the occupant sensing device is transmitted to the air bag control device through the first communication line, and a signal corresponding to information related to selection of an operation state of the air bag driver and belonging to the air bag operation selecting device is transmitted to the air bag control device through the second communication line. And the air bag control device determines a connection state of the air bag operation selecting device to the air bag control device through the second communication line to store information related to the determined connection state in the non-volatile storage device.

The air bag apparatus according to the present invention may also employ an arrangement in which the air bag control device determines a communication state between the air bag control device and the air bag operation selecting device.

More specifically, when the air bag operation selecting device responds within a predetermined period of time, the air bag control device determines a communication state as a matter of course. In addition, when the air bag control device does not respond within the predetermined period of time, and the information related to a connection state stored in the non-volatile storage device corresponds to a state in which the air bag operation selecting device is connected, the air bag control device determines the communication state as an abnormal state because disconnection of the communication line may occur. Even if the air bag control device does not respond within the predetermined period of time, when the information related to the connection state stored in the non-volatile storage device corresponds to a state in which the air bag operation selecting device is not connected, the air bag control device need not determine the communication state because the air bag operation selecting device is not connected. For this reason, this case is obviously discriminated from the case wherein the air bag control device does not respond when the air bag operation selecting device is not connected, and determination of the communication state is not performed.

The air bag apparatus according to the present invention may further comprise a warning unit. When a determined communication state between the air bag control device and the air bag operation selecting device is abnormal, the air bag control device preferably operates the warning unit to obtain reliable confirmation.

In the air bag apparatus according to the present invention, when a determined communication state between the air bag control device and the air bag operation selecting device is abnormal, the air bag control device preferably stores information related to the determined communication state in a memory to obtain convenience in repair.

More specifically, in the air bag apparatus according to the present invention, when the determined communication state between the air bag control device and the air bag operation selecting device is normal, and the information related to the connection state stored in the non-volatile storage device corresponds to a non-connection state, the air bag control device updates the information related to the connection state stored in the non-volatile storage device into a connection state and receives a signal corresponding to the information related to selection of an operation state of the air bag driver and belonging to the air bag operation selecting device to prepare the operation of the air bag.

More specifically, in the air bag apparatus according to the present invention, when the determined communication state is normal, and the information related to the connection state stored in the non-volatile storage device corresponds to a connection state, the air bag control device receives the signal corresponding to the information related to selection of an operation state of the air bag driver and belonging to the air bag operation selecting device to prepare the operation of the air bag.

More specifically, in the air bag apparatus according to the present invention, a plurality of air bags are preferably arranged for a driver's seat, a passenger seat, and the like, and air bag drivers are arranged in correspondence with the plurality of air bags.

More specifically, in the air bag apparatus according to the present invention, the air bag control device preferably performs a series of processes using the information related to the connection state stored in the non-volatile storage device when an ignition switch is in an ON state.

DETAILED DESCRIPTION OF THE PREFERRED EMBODIMENT

An embodiment of the present invention will be described below with reference to the accompanying drawings.

The arrangement of an air bag apparatus according to the embodiment will be described with reference to FIG. 3.

Figure 3:
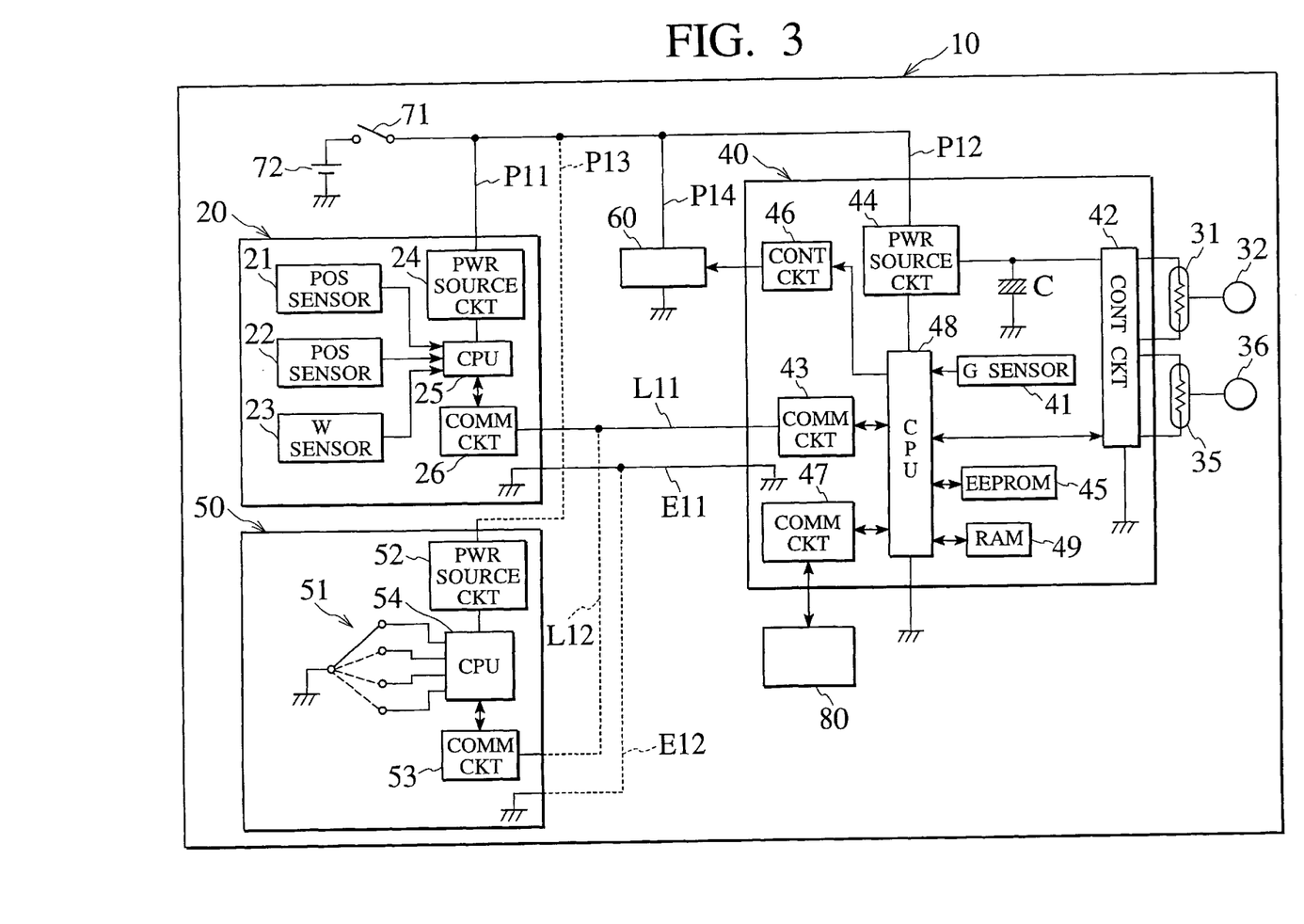
FIG. 3 is a block diagram showing the arrangement of an air bag apparatus according to an embodiment of the present invention.

Referring to FIG. 3, an air bag apparatus 10 according to this embodiment is constituted by an occupant sensing device 20, a driver's seat air bag driver 31, a driver's seat air bag 32, a passenger seat air bag driver 35, a passenger seat air bag 36, an air bag control device 40, an air bag operation selecting device 50, a warning unit 60, and an off-board diagnosis unit 80.

More specifically, the occupant sensing device 20 is constituted by a driver's seat position sensor 21 for detecting the position of the driver's seat of a vehicle, a passenger seat position sensor 22 for detecting the position of the passenger seat of the vehicle, a passenger seat weight sensor 23 for detecting a weight acting on the passenger seat, a power source circuit 24 for supplying a necessary electric power to the constituent elements of the occupant sensing device 20, a CPU 25 for controlling the occupant sensing device 20, and a communication circuit 26 for performing communication with the air bag control device 40. Power lines between the power source circuit 24 and each of the sensors 21 to 23 and a power line between the power source circuit 24 and the communication circuit 26 are omitted.

In the occupant sensing device 20 with the above arrangement, the driver's seat position sensor 21 detects the position of the driver's seat of the vehicle in the forward and backward directions to transmit the detected information to the CPU 25. The CPU 25 which receives the information related to the detected position detects a posture of a driver on the seat on the basis of the detected position.

The passenger seat position sensor 22 detects the position of the passenger seat of the vehicle in the forward and backward directions to transmit the detected information to the CPU 25. The passenger seat weight sensor 23 detects a weight acting on the passenger seat to transmit the detected information to the CPU 25. The CPU 25 which receives the information related to the detected position and the detected weight detects a posture of an occupant on the passenger seat, the presence/absence of setting of a so-called child seat, and a setting direction of the child seat.

The air bag control device 40 is constituted by a G sensor 41 for detecting an acceleration applied on the vehicle to detect collision of the vehicle, an air bag drive control circuit 42 for directly controlling operations of the driver's seat air bag driver 31 and the passenger seat air bag driver 35, a communication circuit 43 for performing communication with the communication circuit 26 of the occupant sensing device 20 and a communication circuit 53 of the air bag operation selecting device 50, a power source circuit 44 for supplying a necessary power to the constituent elements of the air bag control device 40, an EEPROM 45 in which information related to the presence/absence of setting of the air bag operation selecting device 50 is stored, a warning unit control circuit 46 for controlling the warning unit 60, an off-board diagnostic communication circuit 47 for performing communication with the off-board diagnosis unit 80, and a CPU 48 for controlling the air bag control device 40. A power line between the communication circuit 44 and the G sensor 41, power lines between the power source circuit 44 and each of the communication circuits 43 and 47, power lines between the power source circuit 44 and each of the control circuits 42 and 46, and a power line between the power source circuit 44 and the EEPROM 45 are omitted. More specifically, the information related to the presence/absence of setting of the air bag operation selecting device 50 and stored in the EEPROM 45 has the form of a flag corresponding to the presence/absence of setting of the air bag operation selecting device 50, and the initial value of the flag F is set to be 0.

The air bag operation selecting device 50 is constituted by a switch 51 for selecting the operations of the driver's seat air bag driver 31 and the passenger seat air bag driver 35, a power source circuit 52 for supplying a necessary power to the constituent elements of the air bag operation selecting device 50, a communication circuit 53 for performing communication with the communication circuit 43 of the air bag control device 40, and a CPU 54 for controlling the air bag operation selecting device 50. A power line between the power source circuit 52 and the communication circuit 53 is omitted.

In the air bag operation selecting device 50 with the above arrangement, the CPU 54 operates only the driver's seat air bag driver 31 on the basis of a switching state of the switch 51, operates only the passenger seat air bag driver 35, operates the driver's seat air bag driver 31 and the passenger seat air bag driver 35, or inhibits the driver's seat air bag driver 31 and the passenger seat air bag driver 35 from operating, so that the CPU 54 can select the operation states of the driver's seat air bag driver 31 and the passenger seat air bag driver 35.

The driver's seat air bag driver 31 is to develop the driver's seat air bag 32 and includes a squib or the like serving as an igniter. Similarly, the passenger seat air bag driver 35 is to develop the passenger seat air bag 36 and includes a squib.

The warning unit 60, more specifically, is an indicator arranged on a meter panel or the like. The warning unit 60 is turned on by the warning unit control circuit 46 of the air bag control device 40 when predetermined abnormality occurs in communication between the air bag control device 40 and the air bag operation selecting device 50.

The off-board diagnosis unit 80 is connected to the air bag control device 40 by a mechanic man or the like of a dealer as needed. In the off-board diagnosis unit 80, a record of troubles and a diagnosis result related to the air bag apparatus 10 stored in a memory (not shown) of the air bag control device 40 can be displayed on a screen of the off-board diagnosis unit 80, and various instructions can be input to the air bag control device 40 in response to a predetermined command. Here, the record of troubles related to the air bag apparatus 10 represents the history of contents of past troubles, and is stored in a ROM (not shown) in the air bag control device 40. On the other hand, the diagnosis result related the air bag apparatus 10 represents the presence/absence of a present trouble or, if the trouble is present, the contents of the trouble, and is temporarily stored in a RAM (not shown) in the air bag control device 40. If there is a trouble of the air bag apparatus 10 in diagnosis, a necessary repair or the like is performed on the basis of the latest diagnosis result with reference to the record of troubles. In addition, when the air bag control device 40 once determines that the air bag operation selecting device 50 is connected, the flag F=1 is stored in the EEPROM 45 as described later in detail. Therefore, even in case that the air bag operation selecting device 50 is disconnected on demand after that, the warning unit 60 is kept turned on. In order to avoid such an inconvenience, if the air bag operation selecting device 50 is disconnected in this manner, the flag F=1 is reset to F=0 by use of the off-board diagnosis unit 80 according to a predetermined operation.

A battery 72 is connected to the power source circuit 24 of the occupant sensing device 20, the communication circuit 44 of the air bag control device 40, the power source circuit 52 of the air bag operation selecting device 50, and the warning unit 60 through an ignition switch 71 and corresponding power supply lines P11 to P14. That is, the occupant sensing device 20, the air bag control device 40, the air bag operation selecting device 50, and the warning unit 60 are operated when the ignition switch 71 is turned on. In other words, processes and controls performed by the CPU 25 of the occupant sensing device 20, the CPU 48 of the air bag control device 40, and the CPU 54 of the air bag operation selecting device 50 are executed when the ignition switch 71 is turned on.

Here, communication between the air bag control device 40 and the occupant sensing device 20 and communication between the air bag control device 40 and the air bag operation selecting device 50 will be described below in detail.

As is understood from FIG. 3, the communication circuit 43 of the air bag control device 40 and the communication circuit 26 of the occupant sensing device 20 are connected to each other through a communication line L11 serving as a so-called serial communication line, and the communication circuit 26 of the air bag control device 40 and the communication circuit 53 of the air bag operation selecting device 50 are connected to each other through a communication line L12 serving as a serial communication line. The communication line L12 is connected to the communication line L11 in parallel.

Communication between the air bag control device 40 and the occupant sensing device 20 which have the above connection relationship and communication between the air bag control device 40 and the air bag operation selecting device 50 which have the above connection relationship are performed by a so-called polling scheme in which the air bag control device 40 is used as a master station, and the occupant sensing device 20 and the air bag operation selecting device 50 are used as local stations.

More specifically, information of a posture of a driver on the driver's seat, a posture of an occupant on a passenger seat, if necessary, the presence/absence of setting of a so-called child seat, a setting direction of the child seat, and the like is transmitted from the occupant sensing device 20 to the air bag control device 40 through the communication line L11.

Information related to selection of an operation state of the driver's seat air bag driver 31 and the passenger seat air bag driver 35 is intermittently transmitted from the air bag operation selecting device 50 to the air bag control device 40 through the communication line L12 connected to the communication line L11 in parallel at a timing at which communication is not performed between the air bag control device 40 and the occupant sensing device 20.

However, since the air bag operation selecting device 50 is a so-called additional device which is not assembled on a production line, it must be determined whether the air bag operation selecting device 50 is connected to the air bag control device 40 in advance. For this reason, the air bag control device 40 has the following arrangement. That is, when the air bag operation selecting device 50 is connected, the air bag control device 40 receives information representing that the air bag operation selecting device 50 is connected, accompanying with reception of the information related to selection of an operation state of the driver's seat air bag driver 31 or the like from the air bag operation selecting device 50 by the air bag control device 40. As a matter of course, when the air bag operation selecting device 50 is not connected, the air bag control device 40 does not any information from the air bag operation selecting device 50. For this reason, the air bag control device 40 can determine the presence/absence of connection of the air bag operation selecting device 50. The information related to the presence/absence of connection of the air bag operation selecting device 50 is properly stored in the EEPROM 45 of the air bag control device 40 as a flag F.

In the air bag apparatus 10 according to this embodiment having the above arrangement, when the air bag control device 40 determines that the air bag operation selecting device 50 is connected and that the communication between the air bag control device 40 and the air bag operation selecting device 50 is normally performed, the air bag control device 40 performs the following control. That is, when an acceleration detected by the G sensor 41 is equal to or higher than a predetermined value, the air bag control device 40 determines that collision of the vehicle occurs, and the air bag control device 40 controls, for example, so as to operate only the driver's seat air bag driver 31 and not to operate the passenger seat air bag driver 35, or so as to operate the driver's seat air bag driver 31 by a normal ignition in order to normally develop the driver's seat air bag 32 and so as to operate the passenger seat air bag driver 35 by gradual ignition in order to moderately develop the passenger seat air bag 36 at the beginning, on the basis of information such as the posture of a driver on the driver's seat, the posture of an occupant on the passenger seat, depending on the case, the presence/absence of setting of a so-called child seat, and the setting direction of the child seat, and on the basis of the information related to selection of operation states of the driver's seat air bag driver 31 and the passenger seat air bag driver 35.

When the air bag control device 40 determines that the air bag operation selecting device 50 is connected and that the communication between the air bag control device 40 and the air bag operation selecting device 50 is abnormally performed, since the air bag apparatus must be properly repaired, a user or the like typically recognizes the trouble with the warning unit 60 lighted by the air bag control device 40. In this case, a mechanic or the like of a dealer diagnoses the air bag apparatus 10 by using the off-board diagnosis unit 80. A necessary repair or the like is performed on the basis of the diagnosis result with reference to the record of troubles as needed.

When the air bag control device 40 determines that the air bag operation selecting device 50 is not connected, the air bag control device 40 does not determine whether the communication state between the air bag control device 40 and the air bag operation selecting device 50 is normal or not, and the air bag control device 40 does not make the information related to selection of an operation state of the driver's seat air bag driver 31 or the like input from the air bag operation selecting device 50.

The air bag apparatus according to this embodiment, the process related to determination of the presence/absence of connection of the air bag operation selecting device 50 performed by the air bag control device 40 and the process related to determination of the presence/absence of abnormal communication between the air bag control device 40 and the air bag operation selecting device 50 will be described below with reference to FIG. 4.

Figure 4:
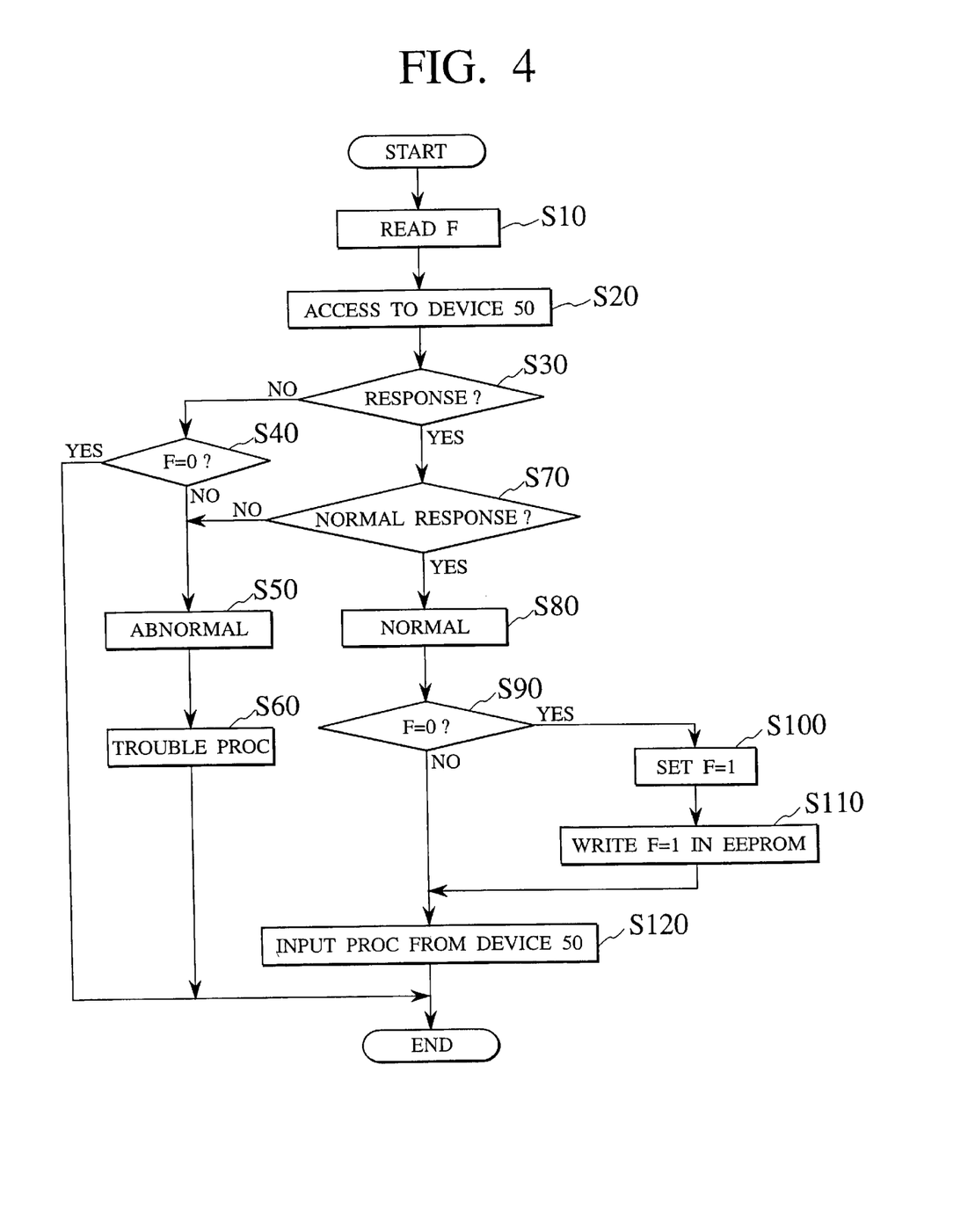
FIG. 4 is a flow chart for determining the state of an additional device in the air bag apparatus according to the embodiment.

Referring to FIG. 4, when the ignition switch 71 is turned on, the CPU 48 in the air bag control device 40 begins operating to start a series of processes.

In step 10 (S10), the CPU 48 reads the setting flag F from the EEPROM 45 to store the setting flag F in a register (not shown) in the CPU 48. Here, the setting flag F corresponds to discrimination information related to the presence/absence of setting of the air bag operation selecting device 50. When the air bag operation selecting device 50 is set, F=1 is satisfied; and when the air bag operation selecting device 50 is not set, F=0 is satisfied. This setting flag F is stored in the EEPROM 45 in the previous series of processes performed by the CPU 48. The current process is performed on the basis of discrimination information related to the presence/absence of setting of the air bag operation selecting device 50. If the current process is performed when the air bag operation selecting device 50 is set for the first time, F=0 is stored in the EEPROM 45 as an initial value.

Next, in step 20 (S20), the CPU 48 transmits a communication signal corresponding to the address of the air bag operation selecting device 50 to the communication circuit 53 through the communication circuit 43 to start access to the air bag operation selecting device 50.

Here, when the air bag operation selecting device 50 is set, the CPU 54 of the air bag operation selecting device 50 responds to the communication signal received through the communication circuit 53 to transmit information representing that the air bag operation selecting device 50 is connected and information related to selection of an operation state of the driver's seat air bag driver 31 or the like to the communication circuit 43 of the air bag control device 40 through the communication circuit 53, and the CPU 48 of the air bag control device 40 receives each such a information. On the other hand, when the air bag operation selecting device 50 is not set, the CPU 48 does not receive any signal.

Therefore, next, in step 30 (S30), the CPU 48 determines whether the information representing that the air bag operation selecting device 50 is connected and the information related to selection of an operation state of the driver's seat air bag driver 31 or the like are received from the air bag operation selecting device 50 within a predetermined period of time, i.e., whether the air bag operation selecting device 50 responds within the predetermined period of time.

Here, when the air bag operation selecting device 50 does not respond within the predetermined period of time, the process shifts to step 40 (S40). In step 40, the CPU 48 determines whether the setting flag is 0 or not. If F=0, by also considering that the air bag operation selecting device 50 does not also respond to any signal, it may be appropriate that the air bag operation selecting device 50 is not actually set in the current process. For this reason, this determination corresponds to a determination that the air bag operation selecting device 50 is not set. Therefore, in this case, the current process is completed.

On the other hand, if the CPU 48 determines in step S40 that the setting flag F is not 0, i.e., F=1, this means that the air bag operation selecting device 50 does not respond to any signal though the air bag operation selecting device 50 is set. For this reason, abnormal communication may occurs because the air bag operation selecting device 50 and the air bag control device 40 are typically disconnected from each other, i.e., the line L12 or a part of the line 11 between the air bag control device 40 and the air bag operation selecting device 50 is broken. Therefore, in step 50 (S50), the CPU 48 determines that abnormal communication occurs because the air bag operation selecting device 50 and the air bag control device 40 are disconnected from each other. Then, in step 60 (S60), the CPU 48 performs a trouble process, i.e., lights the warning unit 60 through the warning unit control circuit 46. At the same time, information representing that the disconnection occurs is stored in a RAM 49 in the air bag control device 40. This information is a kind of diagnosis result for the air bag apparatus 10, and is used in a repair. And the series of processes are completed.

When the CPU 48 determines in step 30 that the air bag operation selecting device 50 responds within the predetermined period of time, the CPU 48 determines in step 70 (S70) whether the response is normal or not. More specifically, this determination is performed by checking the presence/absence of abnormal communication represented by so-called overrunning or a so-called framing error with respect to the information representing that the air bag operation selecting device 50 is connected and the information related to selection of an operation state of the driver's seat air bag driver 31 or the like, which are transmitted from the air bag operation selecting device 50.

Here, if the CPU 48 does not determine in step 70 (S70) that the air bag operation selecting device 50 normally responds, the CPU 48 determines in step 50 that abnormal communication such as overrunning occurs between the air bag operation selecting device 50 and the air bag control device 40. Then, in step 60, the CPU 48 performs a trouble process, i.e., lights the warning unit 60 through the warning unit control circuit 46. At the same time, information representing that the abnormal communication occurs is stored in the RAM 49 in the air bag control device 40. This information is also a kind of diagnosis result for the air bag apparatus 10 and is used for a repair or the like. And the series of processes are completed.

If the CPU 48 determines in step 70 that the air bag operation selecting device 50 normally responds, the CPU 48 determines in step 80 (S80) that communication between the air bag operation selecting device 50 and the air bag control device 40 is normal.

Next, the CPU 48 determines in step 90 (S90) whether the setting flag F is 0 or not. If the setting flag F is not 0, i.e., if F=1, it is determined that the air bag operation selecting device 50 is set, and it is determined that the air bag operation selecting device 50 normally responds and that the communication state is not abnormal. For this reason, the CPU 48 in step 120 (S120) actually performs an input process with respect to the information related to selection of an operation state of the driver's seat air bag driver 31 or the like and output from the air bag operation selecting device 50. More specifically, the information is stored in a RAM (not shown) in the air bag control device 40.

If the CPU 48 determines in step 90 that the setting flag F is 0, i.e., F=0, the CPU 48 determines that the air bag operation selecting device 50 is actually set and normally responds and that the communication state is not abnormal. For this reason, the CPU 48 changes the setting flag F into 1 in step 100 (S100), and the CPU 48 stores the setting flag F in the EEPROM 45 as F=1 in step 110 (S110). Such a situation typically occurs the first series of processes performed after the air bag operation selecting device 50 is set. Next, the process shifts to step 120 (S120), and the CPU 48 actually performs an input process with respect to the information related to selection of an operation state of the driver's seat air bag driver 31 or the like and output from the air bag operation selecting device 50. And the series of processes are completed.

As already explained, the above series of processes are executed by the CPU 48 while the ignition switch 71 is set in an ON state. For this reason, when the CPU 48 determines that the air bag operation selecting device 50 is set and when the setting flag F is stored in the EEPROM 45 as F=1, if new abnormal communication such as disconnection or overrunning does not occur, the CPU 48 performs an input process with respect to the information related to selection of an operation state of the driver's seat air bag driver 31 or the like and output from the air bag operation selecting device 50.

On the other hand, even when the CPU 48 determines that the air bag operation selecting device 50 is set and even when the setting flag F is stored in the EEPROM 45 as F=1, if new abnormal communication such as disconnection or overrunning occurs, the CPU 48 performs a trouble process such as lighting of the warning unit 60.

As described above, in the air bag apparatus according to this embodiment, a setting flag serving as discrimination information representing whether the air bag operation selecting device 50 is set is stored in the EEPROM 45 serving as a non-volatile memory, and it is determined on the basis of the setting flag whether the air bag operation selecting device 50 is set while the ignition switch 71 is set in an ON state. For this reason, a single-purpose line for determining the setting as in the prior art can be excluded, and the communication system can be effectively simplified.

In addition, when the setting flag in the EEPROM 45 corresponds to the state in which the air bag operation selecting device 50 is not set and when the air bag operation selecting device 50 does not respond, the process is completed without determining disconnection, overrunning, or the like and performing a trouble process. For this reason, even in an arrangement in which a communication system is simplified, disconnection or the like can be correctly determined under a situation in which the air bag operation selecting device 50 is set.

In addition, if disconnection or the like is determined, the warning unit is lit, and the determination result is held in the memory. For this reason, a user or the like can correctly understand the situation and is highly convenient for repair.

Furthermore, the determination process regarding setting of the air bag operation selecting device 50 and the reading process regarding the information from the air bag operation selecting device 50 are performed as a series of processes each time the ignition switch 71 is turned on, and therefore, the processes themselves are effectively simplified.

In the above embodiment, as a non-volatile memory for storing a setting flag serving as discrimination information representing whether the air bag operation selecting device 50 is set or not, the EEPROM is used. However, a flash memory may be used as a EEPROM, and another semiconductor element such as EPROM or NV RAM may also be used, and a recording medium such as a magnetic disk, an optical disk, or an optical-magnetic disk may also be used as needed.

In the above embodiment, although various pieces of information are stored in the RAMs (not shown) in the air bag control device 40, these RAMs may be individually provided or may be integrally arranged as one unit as needed. As a matter of course, the RAMs and the RAM 49 may be commonly used as needed.

In the embodiment described above, although the CPU 48 reads the setting flag F from the EEPROM 45 to store the setting flag F in the register (not shown) in the CPU 48, the setting flag F may be stored in a RAM (not shown) in the CPU 48.

In the embodiment described above, a driver's seat air bag and a passenger seat air bag have been explained as object to be controlled. However, a so-called side air bag or the like can be used as an object to be controlled.

The contents of Application No. TOKUGANHEI 10-1031, with a filling date of Jan. 6, 1998 in Japan, are hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. An air bag apparatus comprising:
   an air bag;
   an air bag driver which drives said air bag to develop; and
   an air bag control device controlling said air bag driver,
      said air bag control device having
      a non-volatile storage device, and
      an air bag operation selecting device capable of being connected to said air bag control device, said air bag operation selecting device having information related to selection of an operation state of said air bag driver,
         wherein said air bag control device determines a connection state corresponding to presence or absence of connection of said air bag operation selecting device to said air bag control device, and stores information related to the detected connection state in said non-volatile storage device.

2. An air bag apparatus according to claim 1, wherein said air bag control device controls said drive of said air bag driver according to said information related to said connection state stored in said non-volatile storage device and on the basis of said information related to said selection of said operation state of said air bag driver.

3. An air bag apparatus according to claim 1, further comprising an occupant sensing device sensing information related to seating of an occupant,
   wherein said air bag control device further controls said drive of said air bag driver on said basis of said information sensed by said occupant sensing device.

4. An air bag apparatus according to claim 3, wherein said occupant sensing device further senses information related to a condition to which a seat is set.

5. An air bag apparatus according to claim 1, wherein said air bag control device further determines that a communication state between said air bag control device and said air bag operation selecting device is one of normal and abnormal.

6. An air bag apparatus according to claim 5, further comprising a warning unit, wherein said air bag control device operates said warning unit when said communication is abnormal.

7. An air bag apparatus according to claim 1, wherein a plurality of air bags are arranged as said air bag, and said air bag drivers are arranged in correspondence with said plurality of air bags.

8. An air bag apparatus according to claim 1, wherein said air bag control device uses said information related to said connection state stored in said non-volatile storage device when an ignition switch is set in an ON state.

9. An air bag apparatus comprising:
   an air bag;
   an air bag driver activatable to drive said air bag to develop; and
   an air bag control device controllling said air bag driver,
      said air bag control device having a non-volatile storage device, an air bag operation selecting device capable connection to said air bag control device, and said air bag operation selecting device having information related to selection of an operation state of said air bag driver,
         wherein said air bag control device determines a presence or absence of connection of said air bag operation selecting device to said air bag control device, and stores information related to the detected connection state in said non-volatile storage device, said air bag apparatus further comprising:
   an occupant sensing device sensing information related to seating of an occupant;

a first communication line connecting said occupant sensing device and said air bag control device to each other, a signal corresponding to said information related to said said seating of said occupant sensed by said occupant sensing device being transmitted to said air bag control device through said first communication line; and a second communication line connecting said air bag operation device and said air bag control device to each other, a signal corresponding to said information related to said selection of said operation state of said air bag driver and belonging to said air bag operation selecting device being transmitted to said air bag control device through said second communication line, and said second communication line being connected to said first communication line in parallel, wherein said air bag control device determines said connection state through said second communication line and stores said information indicative of said connection state in said non-volatile storage device.

10. An air bag apparatus comprising:

an air bag;

an air bag driver activatable to drive said air bag to develop; and an air bag control device which controls said air bag driver, said air bag control device having:

a non-volatile storage device, and an air bag operation selecting device capable of connection to said air bag control device, said air bag operation selecting device having information related to selection of an operation state of said air bag driver, wherein said air bag control device determines a presence or absence of connection of said air bag operation selecting device to said air bag control device, and stores information related to the detected connection state in said non-volatile storage device, and wherein said air bag control device further determines that a communication state between said air bag control device and said air bag operation selecting device is normal when said air bag operation selecting device responds within a predetermined period of time.

11. An air bag apparatus according to claim 10, wherein, when said air bag operation selecting device does not respond within a predetermined period of time, and said information related to said connection state stored in said non-volatile storage device corresponds to a state in which said air bag operation selecting device is connected, said air bag control device determines said communication state is abnormal.

12. An air bag apparatus according to claim 11, wherein said air bag control device stores information related to said communication state in said non-volatile storage device, when said communication state is abnormal.

13. An air bag apparatus according to claim 10, wherein, when said air bag operation selecting device does not respond within a predetermined period of time, and said information related to said connection state stored in said non-volatile storage device corresponds to a state in which said air bag operation selecting device is not connected, said air bag control device does not determine said communication state.

14. An air bag apparatus according to claim 10, wherein said air bag control device updatees said information related to said connection state stored in said non-volatile storing device to indicate that said air bag operation selecting device is set and receives a signal corresponding to said information related to said selection of said operation state of said air bag driver and belonging to said air bag operation selecting device, when said communication state is normal and said information related to said connection state stored in said non-volatile storage device corresponds to a non-connection state.

15. An air bag apparatus according to claim 10, wherein said air bag control device receives said signal corresponding to said information related to said selection of said operation state of said air bag driver and belonging to said air bag operation selecting device, when said communication state is normal and said information related to said connection state stored in said non-volatile storage device corresponds to a connection state.

16. An air bag apparatus according to claim 10, further comprising a warning unit, wherein said air bag control device operates said warning unit when said communication is abnormal.

17. An air bag apparatus according to claim 10, wherein said air bag comprises a plurality of air bags and a plurality of corresponding said air bag drivers.

18. An air bag apparatus according to claim 10, wherein said air bag control device uses said information related to said connection state stored in said non-volatile storage device when an ignition switch of a vehicle in which the air bag is disposed, is set in an ON state.

* * * * *